United States Patent
Panferov et al.

(10) Patent No.: US 9,710,704 B2
(45) Date of Patent: Jul. 18, 2017

(54) METHOD AND APPARATUS FOR FINDING DIFFERENCES IN DOCUMENTS

(71) Applicant: ABBYY Development LLC, Moscow (RU)

(72) Inventors: Vasily Vladimirovich Panferov, Moscow (RU); Andrey Anatolievich Isaev, Moscow (RU); Catherine Yurievna Bobrova, Moscow (RU); Olga Zhukovskaya, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 195 days.

(21) Appl. No.: 14/559,078

(22) Filed: Dec. 3, 2014

(65) Prior Publication Data
US 2015/0169995 A1    Jun. 18, 2015

(30) Foreign Application Priority Data
Dec. 18, 2013  (RU) ................................ 2013156257

(51) Int. Cl.
*G06K 9/68* (2006.01)
*G06K 9/54* (2006.01)
*G06K 9/00* (2006.01)

(52) U.S. Cl.
CPC ..... *G06K 9/00483* (2013.01); *G06K 9/00463* (2013.01); *G06K 2209/01* (2013.01)

(58) Field of Classification Search
CPC ........... G06F 17/30011; G06F 17/2211; G06K 9/00483; G06K 9/00463; G06K 9/00442; G06K 9/00456; G06K 9/3275; G06K 2209/01; G06K 9/18; G06K 9/186; G06K 9/228; G06K 9/03; G06K 9/00449; G06K 9/00469; G06Q 10/10
USPC ............... 382/182, 173, 232, 276, 305, 220; 707/1–6, 100–102, 104.1, 104; 235/436; 395/600; 705/67
See application file for complete search history.

(56) References Cited

U.S. PATENT DOCUMENTS

| | | | |
|---|---|---|---|
| 7,593,961 B2 * | 9/2009 | Eguchi | G06K 9/00463 |
| 7,617,195 B2 * | 11/2009 | Liang | G06F 17/30011 |
| 8,196,030 B1 | 6/2012 | Wang et al. | |
| 8,244,036 B2 * | 8/2012 | Hartmann | G06F 17/2211 382/179 |
| 8,453,052 B1 * | 5/2013 | Newman | G06F 17/2211 715/255 |

(Continued)

*Primary Examiner* — Sheela C Chawan
(74) *Attorney, Agent, or Firm* — Lowenstein Sandler LLP

(57) ABSTRACT

Systems and methods for finding and presenting differences between documents are provided. One method includes identifying one or more differences between a first document and at least one second document. The method further includes determining each of the one or more differences to be either a significant difference or an insignificant difference. The determination of whether each of the one or more differences is a significant difference or an insignificant difference may be performed in an automated manner without intervention from a user. The method further includes providing an identification of the significant differences to the user. The method further includes either hiding the insignificant differences from the user or providing an identification of the insignificant differences in a different manner than a manner in which the identification of the significant differences is provided.

24 Claims, 11 Drawing Sheets

(56) References Cited

U.S. PATENT DOCUMENTS

| | | | |
|---|---|---|---|
| 8,472,726 B2* | 6/2013 | Gronau | G06K 9/00402 |
| | | | 382/218 |
| 8,472,727 B2* | 6/2013 | Gronau | G06K 9/03 |
| | | | 358/1.14 |
| 2004/0223648 A1* | 11/2004 | Hoene | G06F 17/2211 |
| | | | 382/218 |
| 2005/0086224 A1* | 4/2005 | Franciosa | G06F 17/30663 |
| 2012/0177291 A1 | 7/2012 | Gronau et al. | |
| 2012/0177295 A1 | 7/2012 | Gronau et al. | |
| 2013/0054612 A1 | 2/2013 | Danielyan et al. | |

* cited by examiner

Amendment to be executed by their duly authorized representatives on the day and year first above written.

901

FIG. 9A executed by their duly authorized representatives on the day and year first above written.

IN WITNESS WHEREOF, the parties hereto have caused this Amendment to be executed by their duly authorized representatives on the

FIG. 10A

IN WITNESS WHEREOF, the parties hereto have caused this Amendment to be executed by their duly authorized representatives on the day and year first above

METHOD AND APPARATUS FOR FINDING DIFFERENCES IN DOCUMENTS

CROSS REFERENCE TO RELATED APPLICATIONS

This application claims the benefit of priority to Russian patent application No. 2013156257, filed Dec. 18, 2013; disclosure of which is incorporated herein by reference.

BACKGROUND

The present disclosure is generally related to devices, systems, methods, and computer programs/algorithms that may be used to process images, documents, and/or texts using, for example, optical character recognition (OCR) and compare the documents to find differences between them.

Currently in document flow, records management, and many aspects of conducting business, one frequently encounters the task of comparing two or more documents that contain text or other information to determine whether they are identical or to find differences in the documents examined. One particular implementation is to compare a copy of a document with its initial version, for example, to exclude the possibility that the document or template was mistakenly or intentionally modified when being completed.

For example, when a contract is entered into after going through a multitude of coordination stages, the following situation is possible. One of the parties to the agreement, some conditionally designated party A, sends a version of the contract to the other party, conditionally designated party B, for subsequent signature. After B has signed the contract, A may wish to ensure that the signed contract corresponds to the initial contract (the original) and does not contain changes or unforeseen corrections, etc. If the entire contract signature procedure is digital using digital signatures, that simplifies the comparison task. However, agreements or other legal documents are frequently signed on paper, after which party A sends either a paper or a scanned (photographed or faxed) copy with a signature.

The task of checking whether documents are identical becomes more cumbersome if a paper version of the document is in the document flow. Currently, this type of problem is addressed by comparing the electronic version and the paper version of the document by hand. As a result, a person (operator) becomes convinced, after careful and meticulous study of the two versions of the document, either that the versions coincide or that they have significant differences. The process becomes noticeably more complicated if there are dozens or hundreds of pages in the contract.

As a rule, to compare printed electronic versions of documents, these documents are converted to text and then it is specifically the text files that are compared. The end result is that the results of this text comparison are shown to the user. However, text comparisons are not always sufficient. In particular, text comparison is insufficient if it is necessary to find discrepancies in layout, coordinates, presence of tables, printing, signatures, stamps or other items, not merely in the text. In addition, for each change in the electronic version, the user needs to find the corresponding places in the two original paper documents by scanning, and then comprehend whether the change found is a significant discrepancy or not.

A method is needed that analyzes documents to identify differences between the documents and presents the results of comparison of the documents in a simple and easily comprehended manner to the user.

SUMMARY

One embodiment of the present disclosure relates to a method for presenting differences between a plurality of documents. The method includes identifying, using a computing device comprising one or more processors, one or more differences between a first document and at least one second document of the plurality of documents. The method further includes determining, using the computing device, each of the one or more differences to be either a significant difference or an insignificant difference. The determination of whether each of the one or more differences is a significant difference or an insignificant difference is performed in an automated manner without intervention from a user of the computing device. The method further includes providing an identification of the significant differences to the user. The method further includes either hiding the insignificant differences from the user or providing an identification of the insignificant differences in a different manner than a manner in which the identification of the significant differences is provided.

Another embodiment relates to a system that includes at least one computing device operably coupled to at least one memory. The at least one computing device is configured to identify one or more differences between a first document and at least one second document of the plurality of documents. The at least one computing device is further configured to determine each of the one or more differences to be either a significant difference or an insignificant difference. The at least one computing device is configured to determine whether each of the one or more differences is a significant difference or an insignificant difference in an automated manner without intervention from a user of the at least one computing device. The at least one computing device is further configured to provide an identification of the significant differences to the user. The at least one computing device is further configured to either hide the insignificant differences from the user or provide an identification of the insignificant differences in a different manner than a manner in which the identification of the significant differences is provided.

Another embodiment relates to a computer-readable storage medium having instructions stored thereon that, when executed by a processor, cause the processor to perform operations. The operations include performing optical character recognition on a first document and at least one second document. The operations further include identifying one or more differences between the first document and the at least one one second document of the plurality of documents based at least in part on the optical character recognition. The operations further include determining each of the one or more differences to be either a significant difference or an insignificant difference. The determination of whether each of the one or more differences is a significant difference or an insignificant difference is performed in an automated manner without intervention from a user. The operations further include providing an identification of the significant differences to the user. The operations further include either hiding the insignificant differences from the user or providing an identification of the insignificant differences in a different manner than a manner in which the identification of the significant differences is provided.

BRIEF DESCRIPTION OF THE DRAWINGS

The disclosure will become more fully understood from the following detailed description, taken in conjunction with the accompanying figures, wherein like reference numerals refer to like elements, in which:

FIGS. 9A and 9B show examples of texts analyzed in accordance with an illustrative embodiment;

FIGS. 10A and 10B show further examples of texts analyzed in accordance with an illustrative embodiment;

FIG. 11 shows an example of an interface according to an illustrative embodiment.

DETAILED DESCRIPTION

Figure 1:
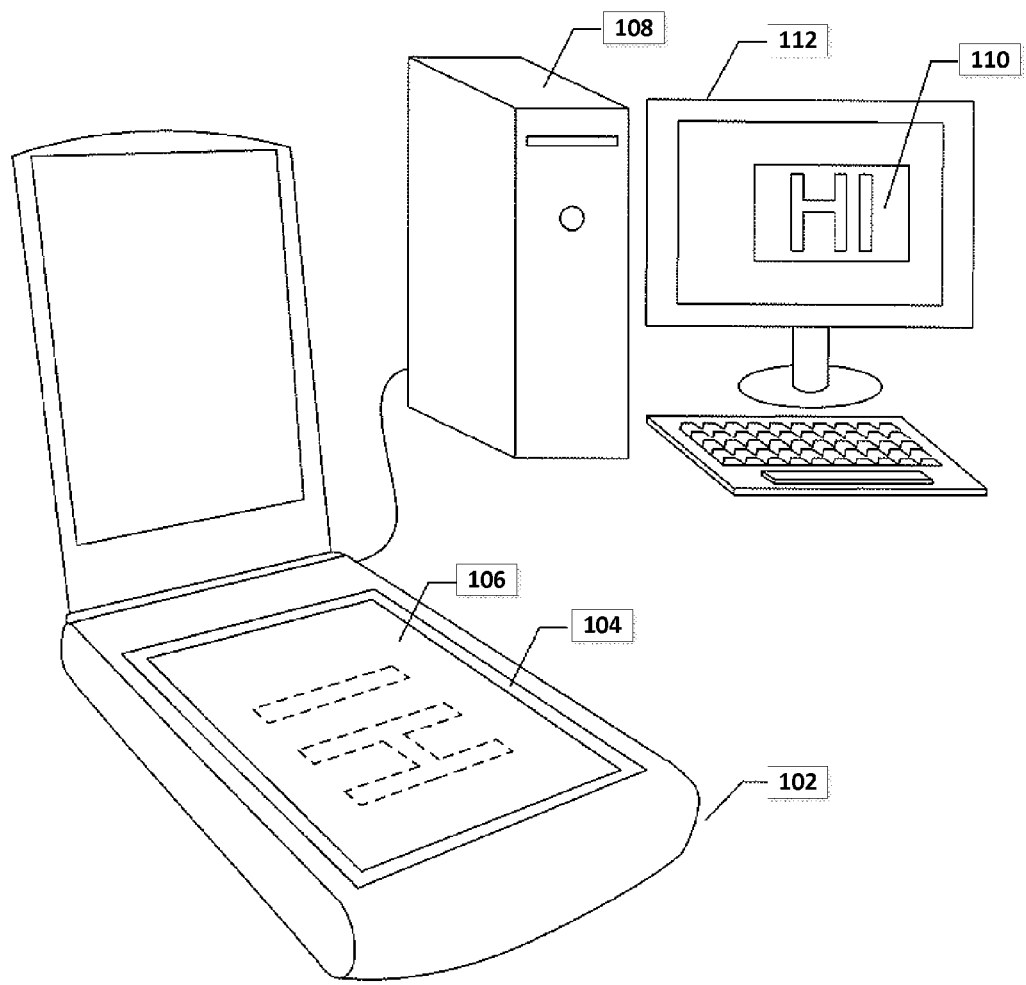
FIG. 1 illustrates a typical desktop scanner and personal computer that are together used to convert printed documents into digitally encoded electronic documents stored in mass-storage devices and/or electronic memories according to an exemplary embodiment.

The present disclosure is generally directed to comparing documents (copies or versions of documents) to determine whether there are discrepancies or changes in them. According to various embodiments, systems and methods are provided that may make it easier for the user (operator) to compare documents by pointing the differences out directly on images of both documents being analyzed, rather than in the digitized text. Using a GUI, the system may allow synchronized display of the documents being compared and directly pointing out visually those places where the user (operator) needs to turn his attention. In addition, the system may make it possible to do filtration and not show the user those differences that do not affect whether the documents are identical. In other words, the system may be configured to display only significant differences (changes) in the versions of the document being compared. As a result of filtration of the discrepancies, some of them may be determined to be "false" and may not be displayed to the operator. Some discrepancies, such as displaced hyphenations or page breaks, are important overall but may not be of interest separately for the operator. In some embodiments, the systems and methods provided herein may help avoid the deficiencies described above and allow display of merely a summary of the significant changes, classified by type. The determination of whether each difference is significant or insignificant may be done in an automated manner (e.g., without intervention by a human/user of the system).

Finding differences when comparing an initial version of a text and an OCR version of the text from an earlier document-comparison stage does not completely indicate that there actually were changes in the documents being analyzed, because there may be "false" differences that arise from the recognition by OCR engine. In connection with these differences, the user (operator) is forced to manually check inaccuracies that have arisen from recognition by OCR engine according to known document comparison systems. Various embodiments of the present disclosure may help reduce the number of such "false" differences presented to the user.

Using the exemplary systems and methods of the present disclosure, the task of comparing documents and finding potentially different places in them may be substantially simplified for the user (or operator). Because the task of comparing documents may be done with human participation, the systems and methods may allow a display for the user (operator) of the problem locations in each of the documents compared. Only significant changes in the documents may be shown to the user, where these changes (in other words, differences) may be filtered out and grouped by type and represented as a list. The task of finding each potential discrepancy in the documents may be done automatically. The exemplary embodiments of the present disclosure may make it possible to reduce the time spent comparing documents and to avoid mistakes associated with the human factor. Various exemplary embodiments may be implemented using a boot command, an operating system, other types of software, and/or hardware.

Printed documents can be converted into digitally encoded, scanned-document images by various means, including electro-optico-mechanical scanning devices and digital cameras. FIG. 1 illustrates a typical desktop scanner and personal computer that are together used to convert printed documents into digitally encoded electronic documents stored in mass-storage devices and/or electronic memories. The desktop scanning device 102 includes a transparent glass bed 104 onto which a document is placed, face down 106. Activation of the scanner produces a digitally encoded scanned-document image which may be transmitted to the personal computer ("PC") 108 for storage in a mass-storage device. A scanned-document-image-rendering program may render the digitally encoded scanned-document image for display 110 on a PC display device 112.

Figure 2:
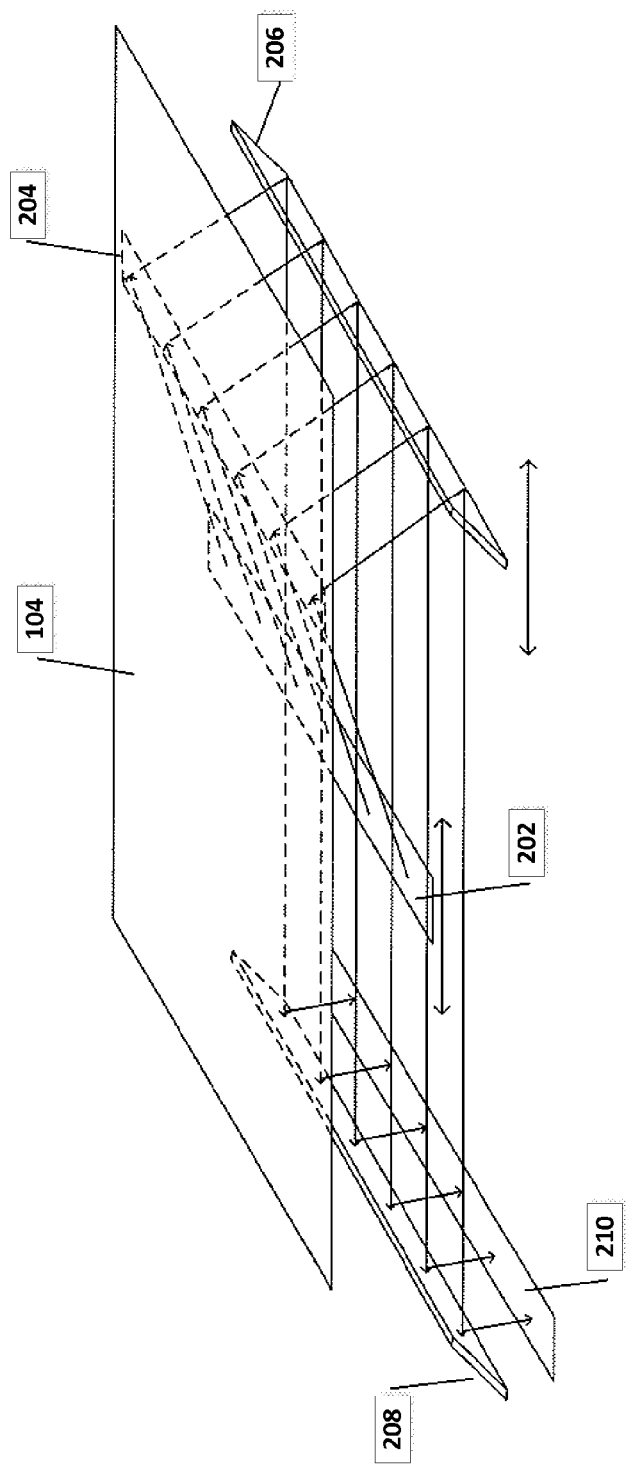
FIG. 2 illustrates operation of the optical components of the desktop scanner shown in FIG. 1 according to an exemplary embodiment.

FIG. 2 illustrates operation of the optical components of the desktop scanner shown in FIG. 1. The optical components in this charge-coupled-device ("CCD") scanner reside below the transparent glass bed 104. A laterally translatable bright-light source 202 illuminates a portion of the document being scanned 204 which, in turn, re-emits and reflects light downward. The re-emitted and reflected light is reflected by a laterally translatable mirror 206 to a stationary mirror 208, which reflects the emitted light onto an array of CCD elements 210 that generate electrical signals proportional to the intensity of the light falling on each of the CCD elements. Color scanners may include three separate rows or arrays of CCD elements with red, green, and blue filters. The laterally translatable bright-light source and laterally translatable mirror move together along a document to produce a scanned-document image. Another type of scanner is referred to as a "contact-image-sensor scanner" ("CIS scanner"). In a CIS scanner, moving colored light-emitting diodes ("LEDs") provide document illumination, with light reflected from the LEDs sensed by a photodiode array that moves together with the colored light-emitting diodes.

Figure 3:
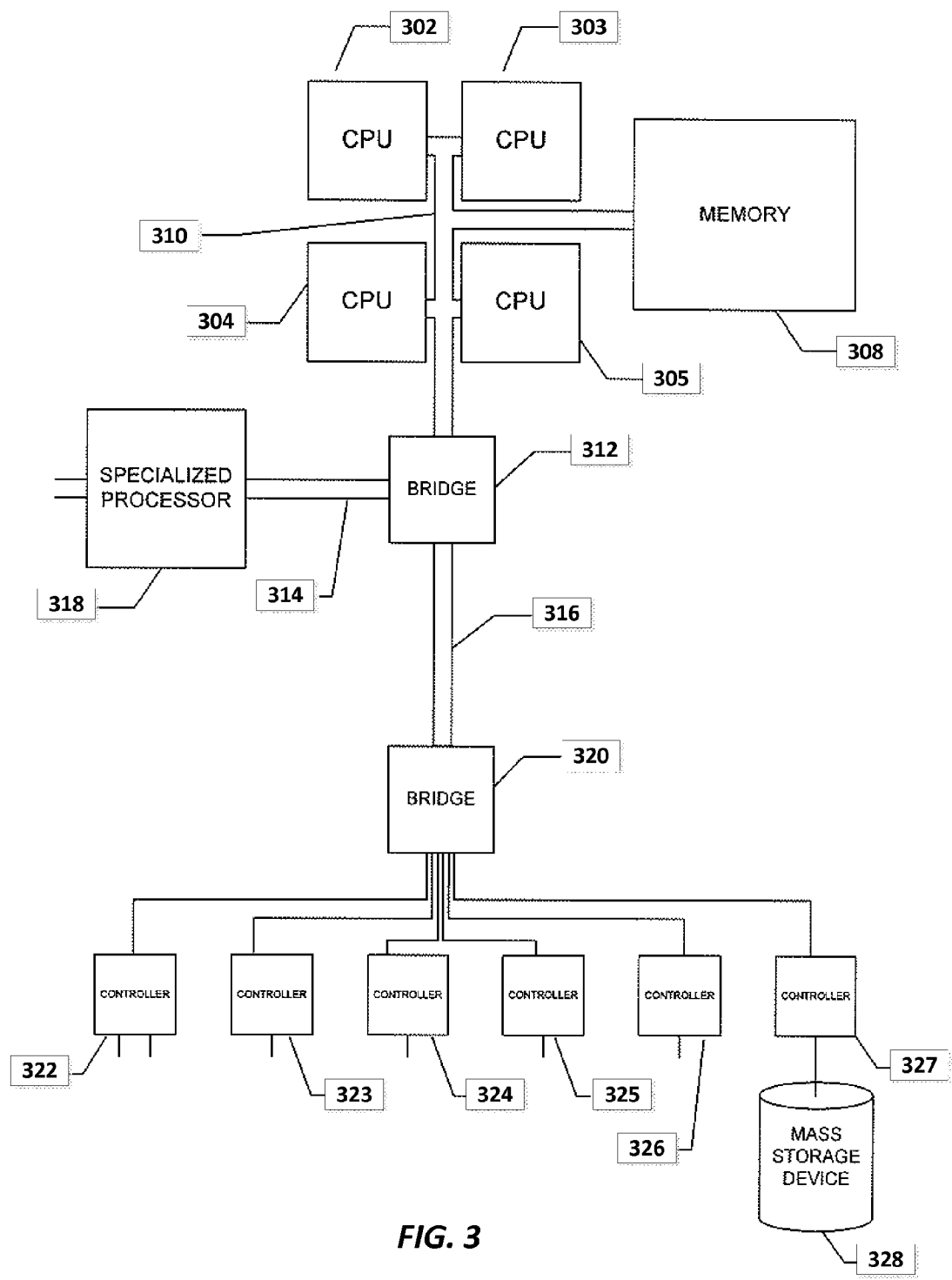
FIG. 3 provides a general architectural diagram for various types of computers and other processor-controlled devices according to an exemplary embodiment.

FIG. 3 provides a general architectural diagram for various types of computers and other processor-controlled devices. The high-level architectural diagram may describe a modern computer system, such as the PC in FIG. 1, in which scanned-document-image-rendering programs and optical-character-recognition programs are stored in mass-storage devices for transfer to electronic memory and execution by one or more processors to transform the computer system into a specialized optical-character-recognition system. The computer system contains one or multiple central processing units ("CPUs") 302-305, one or more electronic memories 308 interconnected with the CPUs by a CPU/memory-subsystem bus 310 or multiple busses, a first bridge 312 that interconnects the CPU/memory-subsystem bus 310 with additional busses 314 and 316, or other types of high-speed interconnection media, including multiple, high-speed serial interconnects. These busses or serial interconnections, in turn, connect the CPUs and memory with specialized processors, such as a graphics processor 318, and with one or more additional bridges 320, which are interconnected with high-speed serial links or with multiple controllers 322-327, such as controller 327, that provide access to various different types of mass-storage devices 328, electronic displays, input devices, and other such components, subcomponents, and computational resources.

Figure 4:
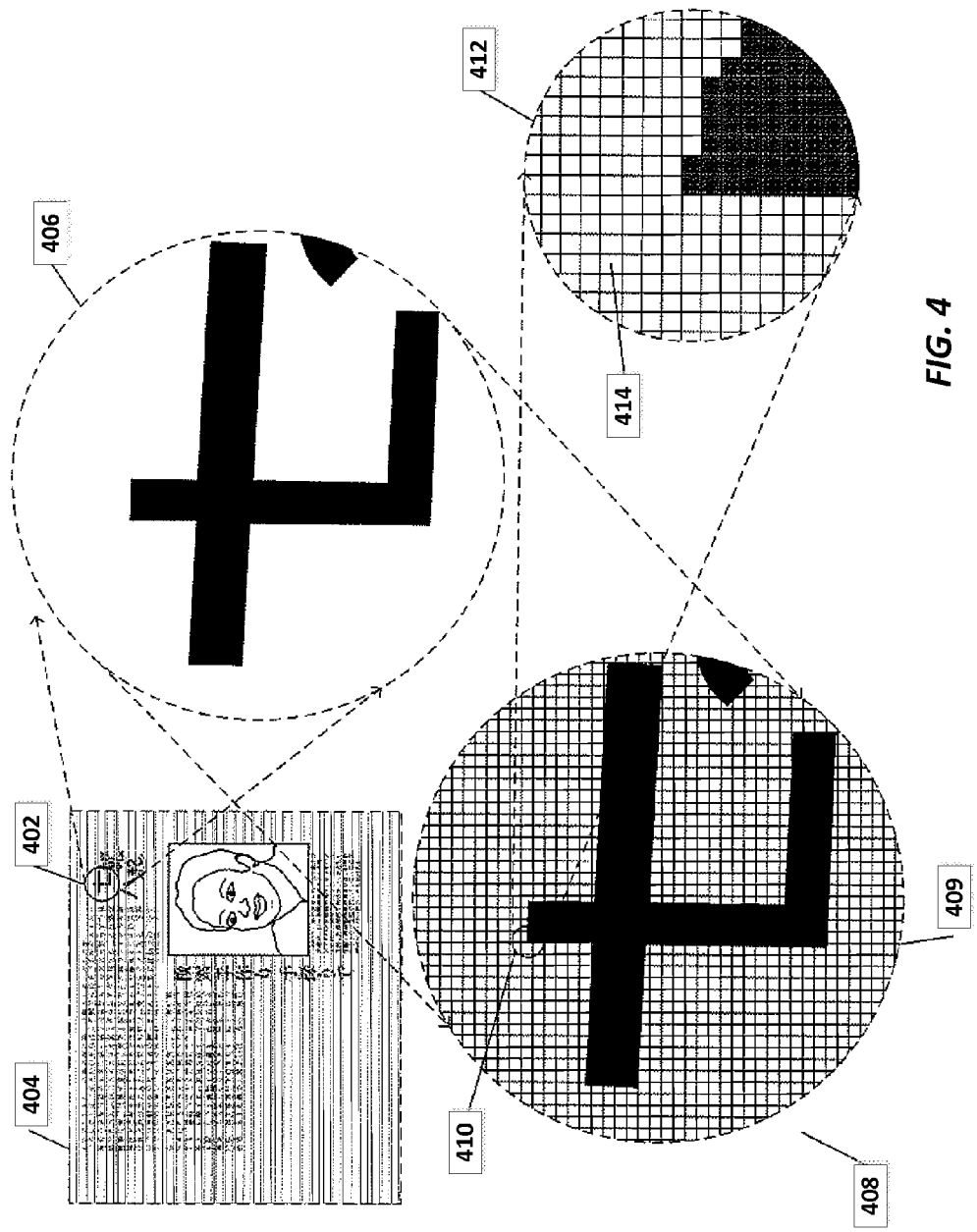
FIG. 4 illustrates digital representation of a scanned document according to an exemplary embodiment.

FIG. 4 illustrates digital representation of a scanned document. In FIG. 4, a small disk-shaped portion 402 of the example printed document 404 is shown magnified (406). A corresponding portion of the digitally encoded scanned-document image 408 is also represented in FIG. 4. The digitally encoded scanned document includes data that represents a two-dimensional array of pixel-value encodings. In the representation 408, each cell of a grid below the characters, such as cell 409, represents a square matrix of pixels. A small portion 410 of the grid is shown at even higher magnification, 412 in FIG. 4, at which magnification the individual pixels are represented as matrix elements, such as matrix element 414. At this level of magnification, the edges of the characters appear jagged, since the pixel is the smallest granularity element that can be controlled to emit specified intensities of light. In a digitally encoded scanned-document file, each pixel is represented by a fixed number of bits, with the pixel encodings arranged sequentially. Header information included in the file indicates the type of pixel encoding, dimensions of the scanned image, and other information that allows a digitally encoded scanned-document-image rendering program to extract the pixel encodings and issue commands to a display device or printer to reproduce the pixel encodings in a two-dimensional representation of the original document. Scanned-document images digitally encoded in monochromatic grayscale commonly use 8-bit or 16-bit pixel encodings, while color scanned-document images may use 24 bits or more to encode each pixel according to various different color-encoding standards. As one example, the commonly used RGB standard employs three 8-bit values encoded within a 24-bit value to represent the intensity of red, green, and blue light. Thus, a digitally encoded scanned image generally represents a document in the same fashion that visual scenes are represented in digital photographs. Pixel encodings represent light intensity in particular, tiny regions of the image and, for colored images, additionally represent a color. There is no indication, in a digitally encoded scanned-document image, of the meaning of the pixels encodings, such as indications that a small two-dimensional area of contiguous pixels represents a text character. Sub-images corresponding to character images can be processed to produce a bit for the character image, in which bits with value "1" correspond to the character image and bits with value "0" correspond to background. Bit maps are convenient for representing both extracted character images as well as patterns used by an OCR system to recognize particular character.

By contrast, a typical electronic document produced by a word-processing program contains various types of line-drawing commands, references to image representations, such as digitally encoded photographs, and digitally encoded text characters. One commonly used encoding standard for text characters is the Unicode standard. The Unicode standard commonly uses 8-bit bytes for encoding American Standard Code for Information Exchange ("ASCII") characters and 16-bit words for encoding symbols and characters of many languages, including Japanese, Mandarin, and other non-alphabetic-character-based languages. A large part of the computational work carried out by an OCR program is to recognize images of text characters in a digitally encoded scanned-document image and convert the images of characters into corresponding Unicode encodings. Clearly, encoding text characters in Unicode takes far less storage space than storing pixilated images of text characters. Furthermore, Unicode-encoded text characters can be edited, reformatted into different fonts, and processed in many additional ways by word-processing programs while digitally encoded scanned-document images can only be modified through specialized image-editing programs.

In an initial phase of scanned-document-image-to-electronic-document conversion, a printed document is analyzed to determine various different regions within the document. In many cases, the regions may be logically ordered as a hierarchical acyclic tree, with the root of the tree representing the document as a whole, intermediate nodes of the tree representing regions containing smaller regions, and leaf nodes representing the smallest identified regions. The tree representing the document includes a root node corresponding to the document as a whole and leaf nodes each corresponding to one of the identified regions. The regions can be identified using a variety of different techniques, including many different types of statistical analyses of the distributions of pixel encodings, or pixel values, over the area of the image. For example, in a color document, a photograph may exhibit a larger variation in color over the area of the photograph as well as higher-frequency variations in pixel-intensity values than regions containing text.

Once an initial phase of analysis has determined the various different regions of a scanned-document image, those regions likely to contain text are further processed by OCR routines in order to identify text characters and convert the text characters into Unicode or some other character-encoding standard. In order for the OCR routines to process text-containing regions, an initial orientation of the text-containing region is determined so that various pattern-matching methods can be efficiently employed by the OCR routines to identify text characters. It should be noted that the images of documents may not be properly aligned within scanned-document images due to positioning of the document on a scanner or other image-generating device, due to non-standard orientations of text-containing regions within a document, and for other reasons. The text-containing regions are then partitioned into sub-images that contain individual characters or symbols, and these sub-images are then generally scaled and oriented, and the character images are centered within the sub-image to facilitate subsequent automated recognition of the character that correspond to the character images.

It should be appreciated that the illustrated embodiments shown and described with respect to FIGS. 1-4 are provided merely for purposes of example, and the methods described herein are not limited to the particular implementations described in those figures. In various embodiments, document images may be acquired from a scanning device, a photographic device (e.g., a photo camera), another device configured with a camera (e.g., mobile devices, such as smartphones, phones, tablets, laptops, etc.), a file stored in a memory of a computing device, an email account, an online storage account, or any other source from which document image data may be received.

Figure 5:
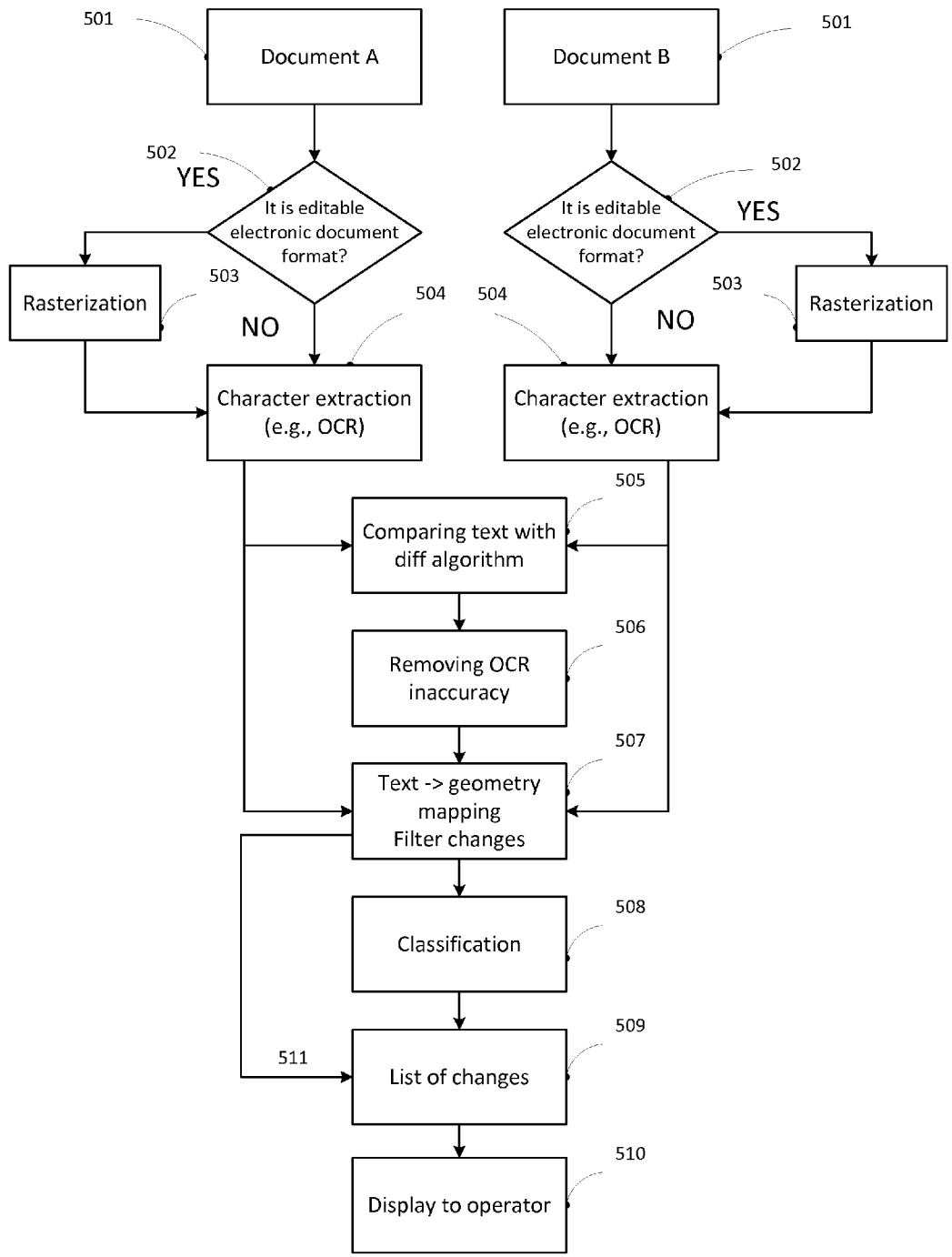
FIG. 5 is a flow chart of a process for comparing documents according to an exemplary embodiment.

Referring now to FIG. 5, a flow diagram of a process for comparing documents and finding differences (changes) in the documents is shown according to an exemplary embodiment. Various copies or versions of a document may be compared. For example, there may be various versions of legal agreements or other legal documents found in the form of similar copies. Documents of any format or representation may be used in the document comparison task. For example, initially only paper documents may be provided for comparison, or only electronic documents. There may also be combined versions of documents provided for input, such as a printed version and an electronic version, and so forth. If this happens, paper versions of the document may be digitized if necessary; for example, paper documents can be scanned, faxed or photographed. As a result, only electronic versions of documents may be utilized at step 501. One of the documents may be a master, or in other words an original, while the other documents are documents to be compared. This designation is arbitrary and does not limit the scope of the present disclosure.

Thus, according to one of the embodiments of the disclosure, the original documents intended for comparison may be presented in paper form as a file with a "picture" such as .jpeg, or .tiff format, etc.; as a PDF file (vector, scanned, or scanned and containing a text layer); as a file from a text editor (such as MS Word or OpenOffice); or in another way (e.g., in a different type of electronic file format).

FIG. 5 illustrates comparison of two versions of documents to determine whether there are differences between them. However, the number of documents to be compared may not be limited to merely two versions. At step 501, more than two versions of a document may be provided initially for comparison; for example, there may be three (or more) differing versions of documents provided. For clarity, in the exemplary embodiments discussed below, we will call the reference document A and will call the document to be compared with it document B.

The issue of whether the electronic document contains editable text is checked at step 502. This procedure is done for all the versions of the documents being compared. If the text in the document is represented in editable format, the text is rasterized at the next step (503). Conversion of a .doc document into .pdf format or printing out a document and then scanning it are clear examples of rasterization. In other words, rasterization can be done using one of the known methods.

If the text is not provided in editable format, there may be an optical character recognition (OCR) step (504) for this document. The OCR procedure may also be performed after the document is rasterized (step 503). In some embodiments, an OCR procedure may not be used in certain situations, such as when there is available information about the size of the page, the text, and/or geometrical coordinates for all characters in the text. For example, if a text file is received with additional information about coordinates of characters (e.g., for an electronic PDF document), OCR may be unnecessary.

Optical character recognition (OCR) systems are used to transform images or representations of paper documents, for example document files in the Portable Document Format (PDF), into computer-readable and computer-editable and searchable electronic files. A typical OCR system consists of an imaging device that produces the image of a document and/or software that runs on a computer that processes the images. This software includes an OCR program, which can recognize symbols, letters, characters, digits, and other units and save them into a computer-editable format—an encoded format.

At step 505, the system may compare the texts produced using OCR of the documents being analyzed. The comparison may be done using any known algorithms for comparing texts. In an alternative embodiment, the universal document similarity method described in Patent Application US20130054612 "Universal Document Similarity" may be used. As a result of applying the text comparison algorithm, an initial draft list of the differences is made for the documents being compared, which in our example are documents A and B.

The draft list of differences is not final, and may include one or more further iterations of checks, sorting, and removal of insignificant discrepancies. These procedures may be used to determine the discrepancies that do exist, but are not differences from the point of view of whether the documents are identical. These may be inaccuracies in running of OCR-engine, differently recognized parts of the text, or something else. Therefore, the list of discrepancies may be filtered after discarding the differences that are insignificant to the user (operator) or are "false."

As indicated before, because different versions of documents may be provided for OCR at stage 501, the same text in different documents may be read differently by OCR. Discrepancies that appear during OCR may be caused by several defects in the documents being compared, such as in the form of a blur, the text being out of focus (defocused), a glare, or excessive noise. In some embodiments, these defects may be caused by scanning or photographing the text. In one embodiment, defects in the form of a blur or out-of-focus (defocused) text may be found and removed using the method described in application Ser. No. 13/305,768 "Detecting and Correcting Blur and Defocusing." However, the probability that there may be inaccuracy in OCR cannot be totally excluded. As a result, even after a small document goes through OCR, there may be discrepancies that in fact are not in the document and, as a result, the task of comparing the documents becomes even more cumbersome.

Because the inaccuracies in the results of recognition by OCR engine for the documents being compared may differ, these inaccuracies may land in the initial draft list of differences prepared at step 505. The differences that appear as a result of OCR may also be placed on the draft list of differences between the documents compared, but they are "false" differences, or insignificant for the operator. For example, the word "if" in the document A version might be recognized as "if," while in the document B version it might be recognized as "it." In order to show the user (operator) a smaller number of discrepancies where these discrepancies do not actually exist, the differences found may be analyzed. Such inaccuracies may be found and removed from the list of differences in the documents compared.

Figure 6:
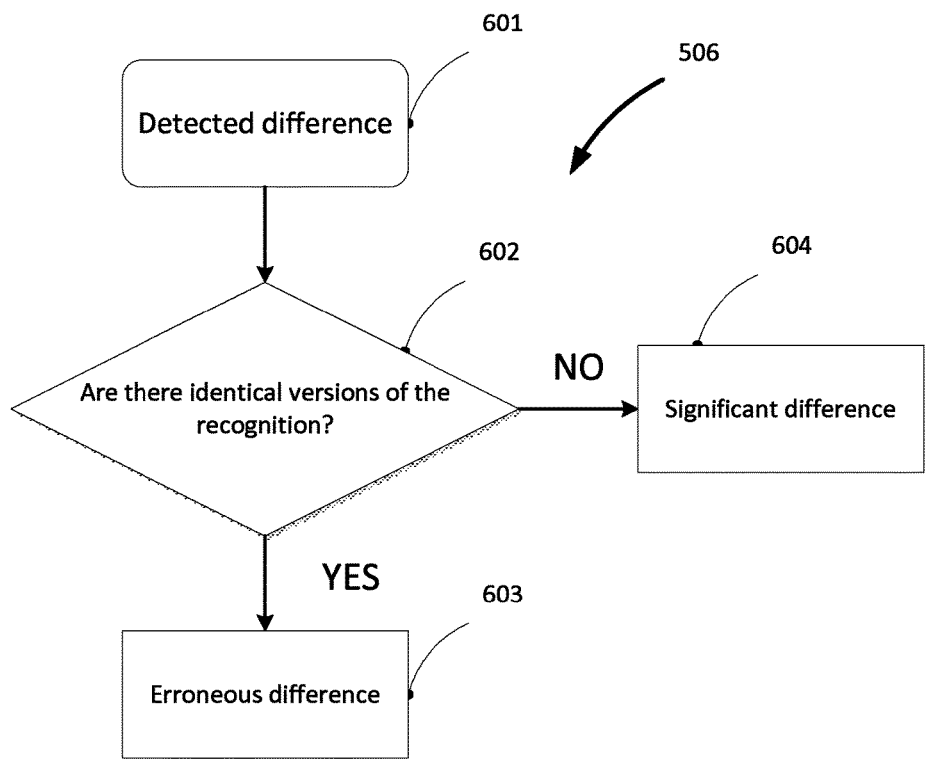
FIG. 6 is a flow chart of a process for finding "false" differences that arise from OCR reading according to an exemplary embodiment.

The differences caused by the peculiarities of the OCR process are found and removed at step 506. The analysis of differences may be performed using one or more of the following features, according to various exemplary embodiments. FIG. 6 shows a flow chart that describes a method for finding "false" differences according to an exemplary embodiment. It is known that for each recognized character (word), an OCR engine forms a set of hypotheses about variations of the recognized character (word). For each of the variant readings, the corresponding weighted values showing some degree of confidence for the recognizing of this character (word) are computed. A detected difference from the initial draft list found in the documents (601) is analyzed by comparing the part that is different in the reference document A and the part that is different in the compared document B. The sets of recognition variants for each of the differing parts in documents A and B are compared. If there are unique (hypotheses) variations of recognition a given fragment on both of the lists of variant (hypotheses) of recognition for the differing fragments (e.g., if a same word variant appears on the variant lists for both documents), then most probably this difference (601) appeared during the recognition process, and that can be recognized as a "false" discrepancy (603). Otherwise, the difference (601) is considered a significant discrepancy (604).

Visually Similar Characters

An alternative way to check differences is to compare the characters (words) that differ in the documents compared. If the characters that differ are graphically similar, then it is very probable that these discrepancies were caused by the peculiarities of recognition. If the discrepancy consists of visually similar characters with different Unicode codes, this discrepancy is also considered insignificant and may not be shown to the user.

The following are examples of differences caused by the visual similarity of characters: the letter "O" and the digit zero "0"; differences in alphabets, such as the letters "ABC" in Cyrillic and the similar letters "ABC" in Latin; the differences caused by differing widths of characters, such as dashes and hyphens of various lengths; fixed spacing and ordinary ink objects; fractions in the form of ¾ and ¾, etc.

Putting in/Removing Spaces

As was already pointed out, because a document to be recognized by OCR may contain defects such as blurs or out-of-focus (defocused) text or some structural defects, there is a probability that the recognition may not be ideal; i.e., there may be inaccuracies in the recognition. For example, during OCR process, spaces may be placed in locations where there actually aren't any or spaces may be lost with successive words being joined. So as not to include these inaccuracies on the list of significant differences, they may be recognized as separate from the results of document editing when the inaccuracies in recognition are filtered.

Figure 7:
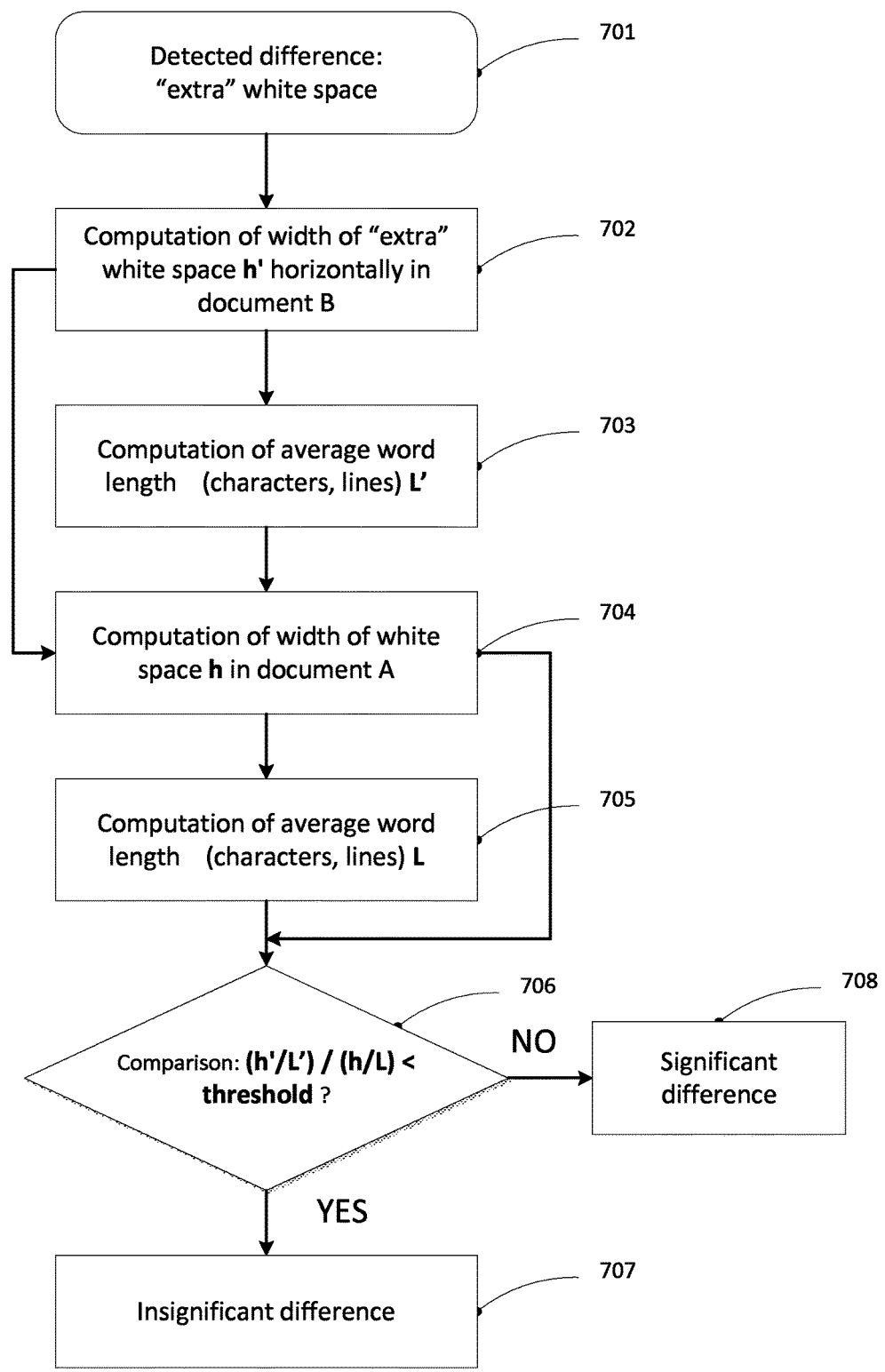
FIG. 7 is a flow chart of a process for checking an "extra" space according to an exemplary embodiment.

FIG. 7 shows an example flow chart of a method for checking an "extra" space detected in accordance with one exemplary embodiment. For example, an extra space (701) may be found in document B. At step 702, the horizontal width h' of this extra space in document B is computed. The distance h between characters in the same version of the recognized text from document A, where the extra space was not found, is computed at step 704. Because the versions of the document may have different resolutions and different font formats, the length of the space may be compared with the value for some fixed character size. For example, the value h' found may be normalized for the length of the word computed at step 703, where the extra space was found. Or the value h' found may be normalized to the mean width of the character or to the mean length of the line. Similarly, at step 705, the standardized value of the word length in document A may be computed.

Then, the normalized values of distances between the characters at the edges [of the space] are compared (706). If the values for the distances between the characters at the edges differ insignificantly, such as no more than some threshold value th, then it is considered that the appearance of the extra distance is caused by the characteristics of OCR, so the discrepancy is considered false, and the data may not be shown to the operator. The size for the threshold value th may be previously established or selected (e.g., by a user). For example, the value for the threshold can be set at 1.7.

If the ratio of the normalized distances between characters is over the threshold value th, then that place may be pointed out to the user/operator by including this difference on the final list of discrepancies and/or by giving the user an indication (e.g., visual depiction) of the place where this difference is located in the document.

The methods described above for checking differences found at steps 505 and/or 506 (e.g., determining how the differences came about) may be performed automatically. In some embodiments, verification of OCR inaccuracies may additionally or alternatively be done manually by a person using the known methods.

Filtration of the Discrepancies

In some embodiments, there may be mistakes other than the OCR inaccuracy that can be filtered out at stage 507. Filtration of discrepancies is intended to determine whether a change found is significant. Insignificant discrepancies may not be shown to the user, while significant discrepancies form a final list of discrepancies intended for the user (operator). To properly do the filtration of changes, in some embodiments, geometry mapping may be utilized. For example, the system may be configured to record the coordinates of a change found in the document, not merely the change itself.

Geometry mapping may be used to visually display the differences found directly in the documents being compared, such as on a computer screen. Geometry mapping is intended to compare the matching parts of the recognized text in the documents being compared. The matching parts of the recognized text are a certain set of dictionary units placed in the same order in documents. Each word is described by a rectangle whose coordinates are restored based on the coordinates for characters produced as a result of the OCR. Further operation may be done precisely with the coordinates of these rectangles, which contain the dictionary units.

Analysis of Line Breaks/Wrap

For example, in some cases in documents there may be insignificant changes because of differences in the document formats, such as in document printing (such as letter or A4 format) or because of the use of a different font, changes in the field sizes, or changes resulting from minor editing of the document. As a result, there may be detected differences in the form of additional word wraps and page breaks, changes in page numbering, etc. The user may not be shown this type of change, only a summary such as "formatting changed" or "there are discrepancies in line breaks and headers and footers", etc.

Figure 8:
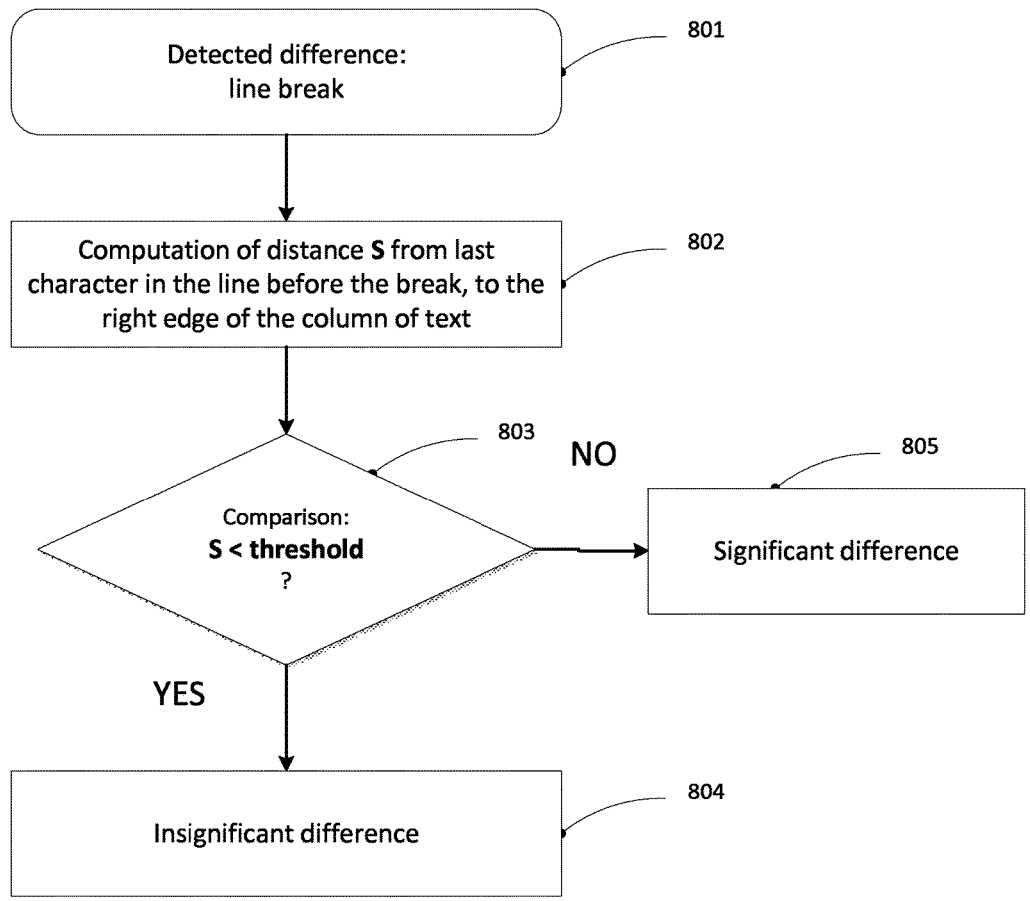
FIG. 8 is a flow chart of a process for checking "line breaks" according to an exemplary embodiment.

An analysis of a change caused by a line break is demonstrated in the flow chart in FIG. 8, according to an exemplary embodiment. If the discrepancy is a line break (801), then the distance S from the last character on the line before the line break to the right edge of the text in the heading is computed at step 802. If the distance from the last letter before the line break to the right edge of the text in the column is larger than some characteristic threshold value t (for example, this value may be equal to the width of 4 letters), then the free space to the end of the line allows one to print a word, and the system may draw the operator's attention to that place, that is, visually show the significance (805) of this change in the text. Otherwise, the changes may be considered insignificant (804) and may not be shown to the user.

In some embodiments, the changes caused by a line break may be analyzed as follows. If the offset from the left edge of the text in the heading is larger than the characteristic value, this place is visually displayed to the operator. If the distance is less than a certain characteristic value, this word wrap is an insignificant change and there is no indication of this type.

FIGS. 9A and 9B show examples of fragments of the versions of the document being compared. For example, in FIG. 9A, the hyphenation to the new line in the phrase "the →day" in the sentence fragment "Amendment to be executed by their duly authorized representatives on the day and year first above written." does not allow printing any new word in the blank area formed (901) in the document because this area is too small. This difference according to the invention presented is considered insignificant. At the same time, in FIG. 10A, the hyphenation in the phrase "this→Amendment" in the sentence fragment "IN WITNESS THEREOF, the parties hereto have caused this Amendment to be executed by their duly authorized representatives on the day and year first above" may be recognized as a significant change because this hyphenation to a new line forms an area large enough (1001) to, for example, allow printing of a small word after the contract has been signed.

Computing the Geometry During Comparison

The text in one of the versions of the document being compared may be modified such that there may be omissions formed in the text, into which something can be printed. Such places may be monitored in the text by monitoring, for each paragraph, the distance between sequential words in the paragraph. If this distance is larger than the maximum permitted gap, then this is an important discrepancy, and it may be visually displayed to the operator. The omissions may be monitored in a way similar to monitoring excess gaps in the documents being compared, and the description of how this is done is described above and illustrated in FIG. 7.

Headers and Footers

If there is a change in the number of lines on one of the first pages of the document, there may be many discrepancies of the form "header/footer on page N has been deleted" in one place and "header/footer has been inserted on page N" in another place. In some embodiments, these differences can be grouped and shown to the user in aggregate form: K headers and footers have been changed. The changes to the text in the headers and footers can then either be displayed or not.

This filter uses information produced based on the results of OCR, from which it is known that the text is a header or a footer. In addition, it is possible to determine that the text is a header or footer based on a combination of several features, such as based on the following features: centered text, text set off from the basic text, a number on a line, etc.

The types of discrepancies shown above may be expanded and put in merely for a clear demonstration of document comparison to determine whether there are changes or significant discrepancies in them. The examples shown above do not limit the scope of the use of this disclosure.

In addition to comparing text information using geometry mapping, other information blocks in the document can be compared, such as tables, pictures, stamps, signatures, etc. Comparing the images present in a document may be done by one of the known methods, such as using pixel by pixel comparison. Comparison of tables not only takes into account the text information in them, comparison of which can be done using the method described above, but also takes into account the structures of the tables. In other words, the correspondence of the number of columns, rows and their corresponding coordinates in the document may be taken into account during comparison.

After all the possible changes and discrepancies in the documents being compared have been found and recorded, the changes may be classified by type. The changes found are classified at step 508. This step is optional and may be skipped (511). Classification of the changes, in accordance with some embodiments, is aimed at solving the task of displaying the discrepancies conveniently and understandably for the user in the form of a compact list. For example, the user may be shown types of significant changes such as "insert," "deletion," "text change", etc. This capability allows the user to quickly determine visually which of the types of discrepancies formed are of significance to him or her and which are insubstantial. For example, a discrepancy of the "character X changed to character Y" type may be insignificant for the user, while a discrepancy of the "word A changed to word B" type may be significant. In some embodiments, a list of differences that have been determined to be insignificant may optionally be shown to the user. Such a list may be presented in a different manner (e.g., only displayed upon selection by a user, displayed lower in an interface, etc.) than the list of significant differences.

In some embodiments, the system may be configured to set up a mode for displaying to the user the results of the comparison conducted. Display of the results of the comparison may also be provided by default in the settings. According to some embodiments, a display function for the user may be chosen for the settings that provides as much comprehensive detail as possible about the results of the analysis done, containing all the differences found, including those caused by inaccurate OCR results. In addition, a user may manually select the types of significant discrepancies that must be included in the final list of discrepancies and those that may be removed from this list. In some embodiments, different variations of the discrepancies found can be established.

Overall List of Discrepancies

Figure 11:
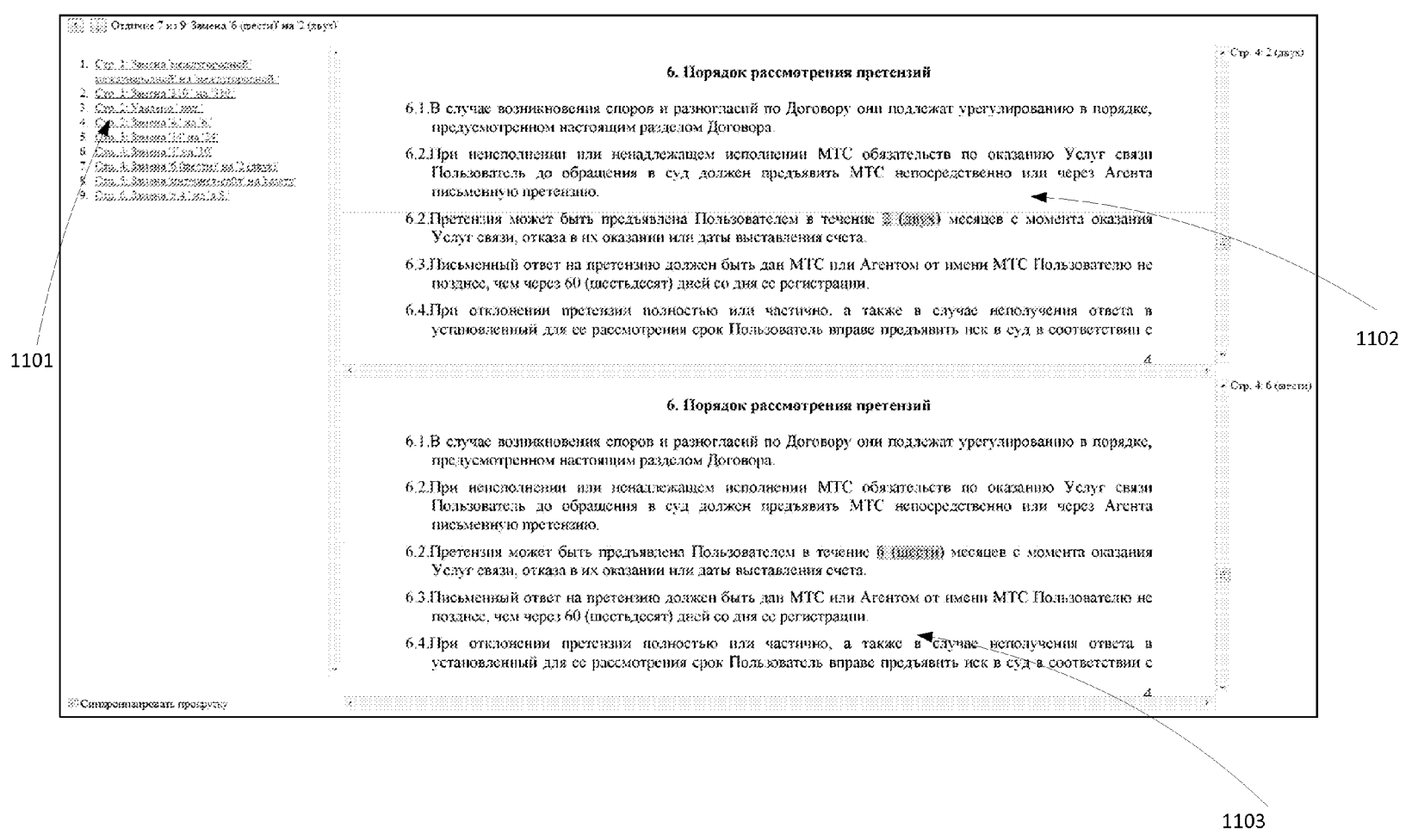

At step 509, a final list is constructed of significant and filtered discrepancies that were found in the documents being compared that were put into the system for processing. This list (or, in other words, a report) may be represented using one of the possible methods. For example, in one of the embodiments of the invention, the list of changes may be shown as in FIG. 11 in the form of a recapitulation of the discrepancies (1101) indicating the page on which the discrepancy in question was found. The list (1101) may display a change of the type « был о» →« стал о» ["was"→"became"], and additional information may also be shown, such as the number of the page on which the discrepancy was located. For example, FIG. 11 shows an example of a user interface that displays a list of significant differences (1101) and images of two documents being compared, (1102) and (1103). The documents being compared may be simultaneously displayed on the screen.

For each significant difference (change) in the list (e.g., for those changes that have gone through the filtration procedure), its coordinates are located on image A and on image B respectively. The data that matches the text and the image by geometry mapping may be used to do that at step 507. When this is done, the user is shown the parts of the images of document A (1102) and document B (1103) that have the location with the discrepancy.

As a result, the user can quickly determine whether there is a change of the document at this location or whether it is an insignificant difference and he can simply bypass it. Various methods may be used to extract information as a visual representation to the user.

One of the results of comparison of documents might be, for example, putting the visual displays of the differing areas on the screen (510). For example, if a discrepancy is found in the documents, the specific area (text) where this difference is located is color-highlighted. The type of difference found may be signaled to the user with a certain color area. In some embodiments, the color of the area may be provided to the user in advance in the settings. For example, yellow may be the signal that in this area differences of the "deleted" type were found, while red might indicate "inserted", etc. In some exemplary embodiments, if a change is found within a word, the entire word is highlighted in yellow and the changed character in it in red. Various other ways of representing (e.g., visually representing) the differences may be utilized in various exemplary embodiments.

Figure 12:
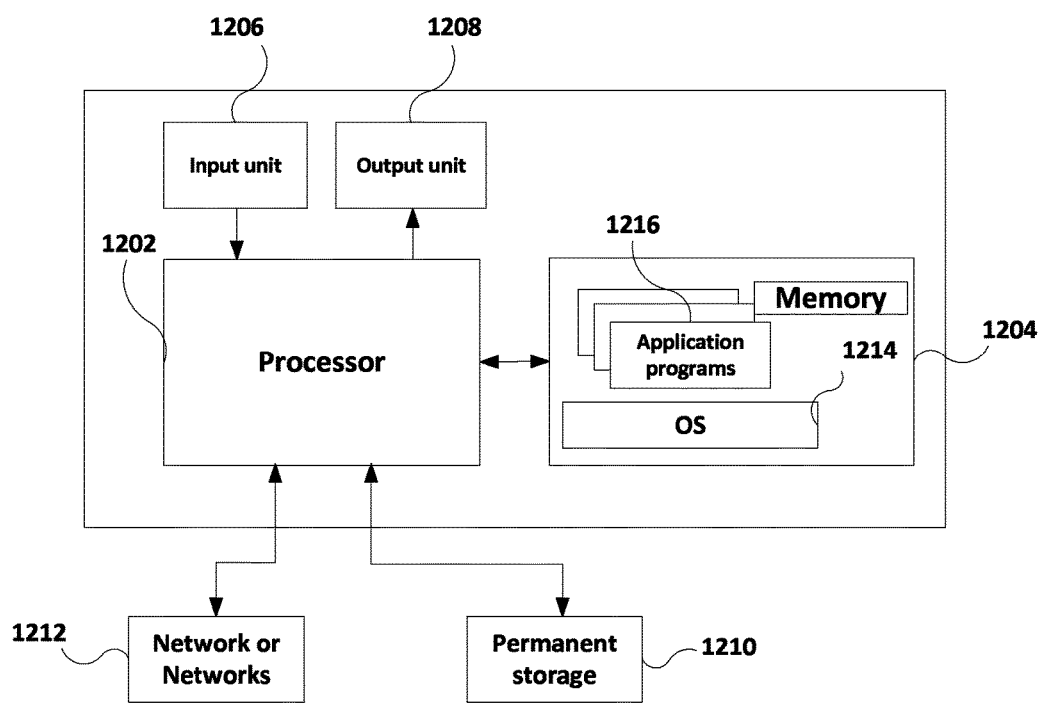
FIG. 12 shows an example of a computer system on which the methods of the present disclosure may be implemented according to an illustrative embodiment.

FIG. 12 shows a possible example of a computer platform (1200) that may be used to implement embodiments of the present disclosure. The computer platform (1200) includes at least one processor (1202) connected to a memory (1204). The processor (1202) may be one or more processors, may contain one, two, or more computer cores or may be a chip or other device capable of doing computation. The memory (1204) may be RAM and may also contain any other types or kinds of memory, particularly non-volatile memory devices (such as flash drives) or permanent storage devices such as hard drives, etc. In addition, an arrangement can be considered in which the memory (1204) includes information-storage media built into equipment physically located somewhere else, as well as on the computer platform (1200) such as cache memory in the processor (1202), used as virtual memory and stored on an external or internal permanent memory device (1210).

The computer platform (1200) also usually has a certain number of input and output ports to transfer information out and receive information. For interaction with a user, the computer platform (1200) may contain one or more input devices (such as a keyboard, a mouse, a scanner, or other) and a display device (1208) (such as a liquid crystal display or special indicators). The computer platform (1200) may also have one or more permanent storage devices (1210) such as an optical disk drive (CD, DVD, or other), a hard disk, or a tape drive. In addition, the computer facilities (1200) may have an interface with one or more networks (1212) that provide connection with other networks and computer equipment. In particular, this may be a local area network (LAN) or a wireless Wi-Fi network, and may or may not be connected to the World Wide Web (Internet). It is understood that the computer facilities (1200) include appropriate analog and/or digital interfaces between the processor (1202) and each of the components (1204, 1206, 1208, 1210 and 1212). Memory 1204 and permanent storage devices 1210 may include any type of computer-readable storage medium. A computer-readable storage medium, as utilized herein, is a non-transitory storage medium (i.e., is not merely a signal in space).

The computer facilities (1200) are managed by the operating system (1214) and include various applications, components, programs, objects, modules and other, designated by the consolidated number 1216.

The programs used to accomplish the methods of the present disclosure may, for example, be a part of an operating system or may be a specialized peripheral, component, program, dynamic library, module, script, or a combination thereof.

The present disclosure is not limited to the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of a class of technical tasks they can solve, not simply as a technical implementation on some base of elements.

What is claimed is:

1. A method for finding and presenting differences between a plurality of documents, the method comprising:
   identifying, using a computing device comprising one or more processors, one or more differences between a first document and a second document of the plurality of documents;
   determining, using the computing device, each of the one or more differences between the first document and the second document to be either a significant difference or an insignificant difference, wherein the determination of whether each of the one or more differences is a significant difference or an insignificant difference is performed in an automated manner without intervention from a user of the computing device;
   providing an identification of the significant differences to the user; and
   either hiding the insignificant differences from the user or providing an identification of the insignificant differences in a different manner than a manner in which the identification of the significant differences is provided.

2. The method of claim 1, further comprising:
   performing optical character recognition on the first document and the at least one second document;
   wherein identifying the one or more differences between the first document and the at least one second document comprises identifying at least one of the one or more differences based on the optical character recognition.

3. The method of claim 2, wherein:
   identifying the one or more differences comprises identifying one or more OCR-related differences likely to have resulted from the optical character recognition; and
   determining each of the one or more differences to be either a significant difference or an insignificant difference comprises determining the one or more OCR-related differences to be insignificant differences.

4. The method of claim 3, wherein identifying the one or more OCR-related differences comprises, for at least a first difference of the one or more differences:
   comparing a first set of hypotheses of recognition for the first difference in the first document with a second set of hypotheses of recognition for the first difference in the at least one second document, wherein the first set of hypotheses of recognition and the second set of hypotheses of recognition comprise a plurality of candidates identified by the optical character recognition as potentially corresponding to the first difference; and
   identifying the first difference as one of the one or more OCR-related differences when the first set of hypotheses of recognition includes a same candidate as the second set of hypotheses of recognition.

5. The method of claim 1, wherein determining each of the one or more differences to be either a significant difference or an insignificant difference comprises, for at least a first difference of the one or more differences:
   determining a first width of a first blank space associated with the first difference in the first document;
   determining a second width of a second blank space associated with the first difference in the at least one second document; and
   determining the first difference to be either a significant difference or an insignificant difference based on a comparison of the first width and the second width.

6. The method of claim 5, wherein determining the first difference to be either a significant difference or an insignificant difference based on the comparison of the first width and the second width comprises determining the first difference to be a significant difference when a difference between the first width and the second width exceeds a threshold value.

7. The method of claim 1, wherein determining each of the one or more differences to be either a significant difference or an insignificant difference comprises, for at least a first difference of the one or more differences:
   determining the first difference to be associated with a line break;
   determining a distance from a last character to a right text edge in a line before the line break for at least one of the first document and the at least one second document; and
   determining the first difference to be a significant difference when the distance exceeds a threshold value.

8. The method of claim 1, wherein providing an identification of the significant differences to the user comprises:
   providing a list of the significant differences to the user; and
   when the user selects a significant difference from the list of significant differences, providing a visualization of the significant difference in the first document and the at least one second document.

9. The method of claim 1, further comprising classifying each of the significant differences according to one of a plurality of difference types, wherein providing an identification of the significant differences to the user comprises providing an indication of the difference type for each of the significant differences.

10. The method of claim 1, further comprising providing the user with an option to display both the identification of the significant differences and the identification of the insignificant differences.

11. A system comprising:
   at least one computing device operably coupled to at least one memory and configured to:
      identify one or more differences between a first document and a second document of a plurality of documents;
      determine each of the one or more differences between the first document and the second document to be either a significant difference or an insignificant difference, wherein the at least one computing device is configured to determine whether each of the one or more differences is a significant difference or an insignificant difference in an automated manner without intervention from a user of the at least one computing device;
      provide an identification of the significant differences to the user; and
      either hide the insignificant differences from the user or provide an identification of the insignificant differences in a different manner than a manner in which the identification of the significant differences is provided.

12. The system of claim 11, wherein the at least one computing device is configured to:
   perform optical character recognition on the first document and the at least one second document; and
   identify at least one of the one or more differences based on the optical character recognition.

13. The system of claim 12, wherein the at least one computing device is configured to:
   identify one or more OCR-related differences likely to have resulted from the optical character recognition; and
   determine the one or more OCR-related differences to be insignificant differences.

14. The system of claim 13, wherein the at least one computing device is configured, for at least a first difference of the one or more differences, to:
   compare a first set of hypotheses of recognition for the first difference in the first document with a second set of hypotheses of recognition for the first difference in the at least one second document, wherein the first set of hypotheses of recognition and the second set of hypotheses of recognition comprise a plurality of candidates identified by the optical character recognition as potentially corresponding to the first difference; and
   identify the first difference as one of the one or more OCR-related differences when the first set of hypotheses of recognition includes a same candidate as the second set of hypotheses of recognition.

15. The system of claim 11, wherein the at least one computing device is configured, for at least a first difference of the one or more differences, to:
   determine a first width of a first blank space associated with the first difference in the first document;
   determine a second width of a second blank space associated with the first difference in the at least one second document; and
   determine the first difference to be either a significant difference or an insignificant difference based on a comparison of the first width and the second width.

16. The system of claim 15, wherein the at least one computing device is configured to determine the first difference to be a significant difference when a difference between the first width and the second width exceeds a threshold value.

17. The system of claim 11, wherein the at least one computing device is configured, for at least a first difference of the one or more differences, to:
   determine the first difference to be associated with a line break;
   determine a distance from a last character to a right text edge in a line before the line break for at least one of the first document and the at least one second document; and
   determine the first difference to be a significant difference when the distance exceeds a threshold value.

18. The system of claim 11, wherein the at least one computing device is configured to:
   provide a list of the significant differences to the user; and
   when the user selects a significant difference from the list of significant differences, provide a visualization of the significant difference in the first document and the at least one second document.

19. The system of claim 11, wherein the at least one computing device is configured to classify each of the significant differences according to one of a plurality of difference types and provide an indication of the difference type for each of the significant differences.

20. A computer-readable storage medium having instructions stored thereon that, when executed by a processor, cause the processor to perform operations comprising:
   performing optical character recognition on a first document and a second document of a plurality of documents;
   identifying one or more differences between the first document and the second document of the plurality of documents based at least in part on the optical character recognition;
   determining each of the one or more differences between the first document and the second document to be either a significant difference or an insignificant difference, wherein the determination of whether each of the one or more differences is a significant difference or an insignificant difference is performed in an automated manner without intervention from a user;
   providing an identification of the significant differences to the user; and
   either hiding the insignificant differences from the user or providing an identification of the insignificant differences in a different manner than a manner in which the identification of the significant differences is provided.

21. The computer-readable storage medium of claim 20, wherein:
   identifying the one or more differences comprises identifying one or more OCR-related differences likely to have resulted from the optical character recognition; and
   determining each of the one or more differences to be either a significant difference or an insignificant difference comprises determining the one or more OCR-related differences to be insignificant differences.

22. The computer-readable storage medium of claim 21, wherein identifying the one or more OCR-related differences comprises, for at least a first difference of the one or more differences:
   comparing a first set of hypotheses of recognition for the first difference in the first document with a second set of hypotheses of recognition for the first difference in the at least one second document, wherein the first set of hypotheses of recognition and the second set of hypotheses of recognition comprise a plurality of candidates identified by the optical character recognition as potentially corresponding to the first difference; and
   identifying the first difference as one of the one or more OCR-related differences when the first set of hypotheses of recognition includes a same candidate as the second set of hypotheses of recognition.

23. The computer-readable storage medium of claim 20, wherein determining each of the one or more differences to be either a significant difference or an insignificant difference comprises, for at least a first difference of the one or more differences:
   determining a first width of a first blank space associated with the first difference in the first document;
   determining a second width of a second blank space associated with the first difference in the at least one second document; and
   determining the first difference to be a significant difference when a difference between the first width and the second width exceeds a threshold value.

24. The computer-readable storage medium of claim 20, wherein determining each of the one or more differences to be either a significant difference or an insignificant difference comprises, for at least a first difference of the one or more differences:
   determining the first difference to be associated with a line break;
   determining a distance from a last character to a right text edge in a line before the line break for at least one of the first document and the at least one second document; and
   determining the first difference to be a significant difference when the distance exceeds a threshold value.

* * * * *